E. S. STOTTS.
DRAIN VALVE TRAP.
APPLICATION FILED JULY 30, 1921.

1,396,077.

Patented Nov. 8, 1921.

Witnesses:

Inventor:
ELZA S. STOTTS
By Earl M. Sinclair
Atty.

UNITED STATES PATENT OFFICE.

ELZA S. STOTTS, OF DES MOINES, IOWA, ASSIGNOR TO THE RAILWAY SIGNAL & EQUIPMENT COMPANY, OF DES MOINES, IOWA, A CORPORATION OF MAINE.

DRAIN-VALVE TRAP.

1,396,077.

Specification of Letters Patent.   Patented Nov. 8, 1921.

Substitute for abandoned application Serial No. 833,811, filed March 31, 1914. This application filed July 30, 1921. Serial No. 488,698.

*To all whom it may concern:*

Be it known that I, ELZA S. STOTTS, a citizen of the United States of America, and resident of Des Moines, Polk county, Iowa, have invented a new and useful Drain-Valve Trap, of which the following is a specification.

An object of this invention is to provide an improved drain-valve trap for steam lines and especially adapted for use in railway passenger equipment.

A further object of this invention is to provide means for manually draining a steam line in addition to the automatic draining otherwise provided.

My invention consists in the construction, arrangement and combination of elements hereinafter set forth, pointed out in my claim and illustrated by the accompanying drawing, in which—

Figure 1:
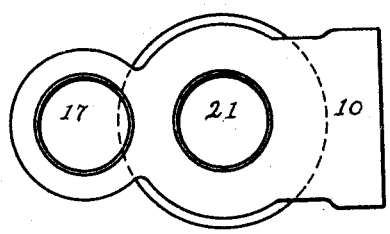
Figure 3:
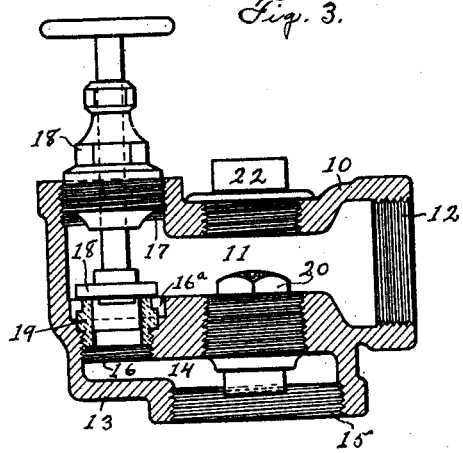
Figure 2:
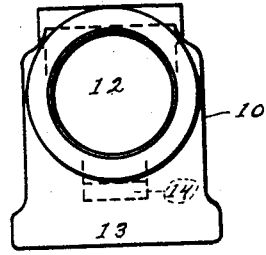

Figure 1 is a plan of the trap detached, a valve and closing plug being removed. Fig. 2 is an end elevation of the same. Fig. 3 is a longitudinal vertical section of the complete device.

In the construction of the device as shown the trap is cast in one piece and comprises a body portion 10 of irregular form and provided with an interior chamber 11. The body 10 is formed with an interiorly threaded opening 12 at one end for the reception of a pipe (not shown) forming part of a steam line such as is used in heating passenger cars. The body 10 is formed with a downward extension 13 on its bottom formed with a port 14 having an interiorly threaded exit opening 15. The exit opening 15 is adapted to receive connection of a drain pipe (not shown) leading to any suitable place of discharge. A passage 16 leads from the chamber 11 to the port 14 at that end of the body 10 opposite to the opening 12. An interiorly threaded opening 17 is formed in the top of the body 10 directly above the opening 16 and a valve 18 is screwed therein and adapted for manual operation to open and close the said opening 16. A bushing 19 is screwed in the opening 16 and forms a seat for the valve 18. The opening 16 is formed with a rabbet 16ª at its upper end for the reception of the valve 18, and the bushing 19 is shouldered to insure tight fit of the valve thereon.

The bottom of the body 10 is formed with an interiorly threaded opening between the chamber 11 and port 14, and a drain valve 20 is screwed therein. The valve 20, which is not here shown in detail, is illustrated, described and claimed in Letters Patent of the United States Number 996,600 granted to me on June 27, 1911, to which patent reference hereby is made. It is the function of the valve 20 to automatically permit escape of steam and water of condensation from the radiation pipes when the pressure therein has been reduced below a certain minimum.

An interiorly threaded opening 21 is formed in the top of the body 10 directly above the drain valve 20 to permit access thereto from above at times, and said opening normally is closed by a screw plug 22.

The trap permits cleaning and clearing of the steam pipes whenever desired, irrespective of the automatic draining through the valve 20, by manual opening of the valve 18. In such event the steam passes over the valve 20, through the passage 16 to the port 14, and thence out through the drain pipe. The valve 18 normally is kept closed.

The location of the drain valve 20 on the level of the floor of the chamber 11, instead of in a pocket, and between the opening 12 and manual valve 18, thus requiring the steam to blow over said drain valve when the valve 18 is opened, renders the trap self cleaning, as all sediment not carried through the drain valve is carried off through the opening 16. The drain valve need never be removed for the purpose of cleaning, as is frequently necessary with the ordinary type of trap.

I claim as my invention—

A self-cleaning drain-valve trap, comprising a body formed with a chamber closed at one end, an entrance opening from the exterior of the body directly to said chamber at its opposite end, an extension on said body formed with a port, an exit opening in the bottom of said port, an automatic drain valve between said chamber and port in alinement with said exit opening, an opening in said body above and in alinement with said drain valve, means for closing the latter opening, and a valve-controlled passage between said chamber and port at one side of said drain valve and adjacent the closed end of said chamber.

Signed at Des Moines, in the county of Polk and State of Iowa, this 27th day of July, 1921.

ELZA S. STOTTS.